(12) United States Patent
Meyer (10) Patent No.: US 11,801,458 B2
(45) Date of Patent: Oct. 31, 2023

(54) PORTABLE PARTICULATE FILTERING SYSTEM AND METHOD

(71) Applicant: Pristine Environmental, LLC, Las Vegas, NV (US)

(72) Inventor: Peter Meyer, Las Vegas, NV (US)

(73) Assignee: Pristine Environmental, LLC, St. Joseph, MN (US)

( * ) Notice: Subject to any disclaimer, the term of this patent is extended or adjusted under 35 U.S.C. 154(b) by 95 days.

(21) Appl. No.: 17/554,187

(22) Filed: Dec. 17, 2021

(65) Prior Publication Data

US 2022/0105448 A1 Apr. 7, 2022

Related U.S. Application Data

(63) Continuation of application No. 15/875,489, filed on Jan. 19, 2018, now abandoned.

(51) Int. Cl.
| | |
|---|---|
| *B01D 21/00* | (2006.01) |
| *C02F 11/122* | (2019.01) |
| *B01D 21/30* | (2006.01) |
| *B01D 29/35* | (2006.01) |
| *C02F 11/121* | (2019.01) |
| *B01D 3/10* | (2006.01) |

(52) U.S. Cl.
CPC ....... *B01D 21/0021* (2013.01); *B01D 21/305* (2013.01); *B01D 29/35* (2013.01); *C02F 11/121* (2013.01); *C02F 11/122* (2013.01); *B01D 3/10* (2013.01); *B01D 2201/02* (2013.01)

(58) Field of Classification Search
None
See application file for complete search history.

(56) References Cited

U.S. PATENT DOCUMENTS

| | | | |
|---|---|---|---|
| 1,950,254 | A | 3/1934 | Gilbert |
| 5,062,500 | A | 11/1991 | Miller |
| 5,139,673 | A | 8/1992 | Martin |
| 5,394,601 | A | 3/1995 | Sutton |
| 6,419,839 | B1 | 7/2002 | Cox |

(Continued)

OTHER PUBLICATIONS

Non-Final Office Action dated Apr. 16, 2020 in U.S. Appl. No. 15/875,489.

(Continued)

*Primary Examiner* — Jonathan M Peo
(74) *Attorney, Agent, or Firm* — Dicke, Billig & Czaja, PLLC (57) ABSTRACT

A filtering system capable of removing particulates from a water slurry is disclosed. The filtering system comprises a base plate, the base plate comprising a sealing surface and a slurry inlet. A flexible vessel is configured to seal to the sealing surface, and an interior cavity, wherein the flexible vessel is formed of a flexible filtering material capable of retaining particulates. The flexible vessel permits liquid entering through the slurry inlet to pass through the filtering material and is capable of withstanding an internal pressure sufficient to form a particulate cake without rupturing the flexible vessel. A sealing system is provided for retaining an upper portion of the flexible vessel against the sealing surface. The filtering system may be part of a portable system that includes a cart, hoses, piping, a pneumatic pump and a control panel.

22 Claims, 4 Drawing Sheets

(56) References Cited

U.S. PATENT DOCUMENTS

| | | |
|---|---|---|
| 2010/0155336 A1 | 6/2010 | Simonson |
| 2012/0261359 A1* | 10/2012 | Quintel ................ B01D 24/042 |
| | | 210/806 |
| 2014/0008308 A1 | 1/2014 | Guy |
| 2014/0034580 A1 | 2/2014 | Chen |
| 2016/0263503 A1 | 9/2016 | Holbach |
| 2017/0296946 A1* | 10/2017 | Vette .................... B01D 25/164 |
| 2017/0296948 A1 | 10/2017 | Richter |

OTHER PUBLICATIONS

Final Office Action dated Jan. 25, 2021 in U.S. Appl. No. 15/875,489.
Non-Final Office Action dated Jul. 19, 2021 in U.S. Appl. No. 15/875,489.

\* cited by examiner

PORTABLE PARTICULATE FILTERING SYSTEM AND METHOD

CROSS-REFERENCE TO RELATED APPLICATION

This Utility patent application is a continuation application of U.S. application Ser. No. 15/875,489, filed Jan. 19, 2018, which is incorporated herein by reference.

BACKGROUND

The present invention relates to filtration methods. In particular, the present invention relates to systems for filtering particulates from a slurry, referred to as "dewatering a slurry" and forming a particulate cake for solid waste disposal.

Construction activities such as cutting, grinding and polishing aggregate materials such as rock, concrete, tile, brick and block utilize water to lubricate and cool the cutting and grinding blades. The liquid waste is cloudy and contains particulates that cannot be disposed of without purification prior to disposal in a municipal liquid waste treatment system. Cloudy water is sometimes referred to as "gray water". The liquid waste prior to treatment is referred to as a slurry. The solids must be removed from the slurry before the liquid may be disposed of.

Municipalities have different clean water standards. But federal law requires that the contractor purify the water by removing a majority of the solids. In addition to removing solids, the pH sometimes requires adjustment to be within the limits set by the water authorities.

Businesses that generate a large volumes of waste water typically have elaborate collection and treatment systems. For example, a granite cutting facility typically contains and collects the waste water in a containment system such as a concrete lined pit locating beneath the granite processing area. The waste water may be agitated and is pumped into large, stationary filter press that has multiple plates that form multiple particulate cakes. The filter press has multiple plates, each with at least one filtering surface. The plates are typically mounted to a frame including two horizontal rods and each plate hangs vertically within the frame, and slides on the rods.

Each plate has a sealing surface for sealing to an adjacent frame. The frames are brought together, and a pressure is applied by the frame at one end and by a hydraulic jack at an opposite end of the set of plates horizontally to create a liquid tight seal between the plates. A high pressure pump forces the waste water through the plates and the particulates are trapped on a filtering media on the plates. A hydraulic jack holds the plates together with a very large clamping force within a heavy duty frame structure during filtering. The filter press frame must be strong enough to withstand the force of the hydraulic jack, which requires the frame to be very bulky, heavy and costly. After the cakes are formed, the system pressure is released, and the hydraulic jack that holds the plates together is withdrawn. The plates are spread apart either manually or automatically. Cakes formed between the plates are released and are then able to fall vertically from between adjacent plates into a solid waste container. The cakes may be hauled off and disposed of, or may be recycled by incorporating the material into other products such as concrete, clay, brick or other building materials.

Contractors and individuals who work on smaller projects often don't have access to elaborate water containment systems and filtering equipment. They preferably work on hard surfaces where the waste water can fall onto plastic sheeting that has dams built under the sheeting, or onto a hard surface such as a concrete slab where the waste water can be vacuumed up with a wet-dry vacuum. This waste is then dumped into 55 gallon drums or into sturdy plastic bags and is hauled off of the job site for further processing and disposal. These containers are very heavy and not only cause muscle strain, but may require loading equipment such as a fork truck and that equipment might not be available on some job sites.

Known water filtration systems could be used to process the waste water at the job site. Known systems are bulky, expensive and too heavy for delivery to a job site in a small vehicle such as a van or a pick-up truck, and cannot easily be unloaded by one or two people. Portable plate dewatering filtration systems are too heavy to be unloaded and reloaded into a vehicle without the aid of loading equipment.

It would be desirable to provide a portable filtration system that can be loaded and unloaded by one person without the use of loading equipment, and a method for dewatering and treating waste water generated on smaller construction jobs where no stationary filtration systems are available for use.

SUMMARY

The present invention is a portable filtration system capable of treating a water slurry containing particulates, such as concrete or granite dust on a job site that lacks a stationary containment filtration system, such as a patio construction project at a residential home construction site. Systems of the present invention may comprise a moveable cart configured to retain and transport the filtration system to the job site. The cart may be configured with an upright support frame with a handle, a base and a set of wheels mounted to an axle that is mounted to the frame. The axis is spaced apart from the base for allowing the cart to be tipped and manually moved to an area where waste water is being generated. In examples of the invention, the system is portable, compact and light enough in weight to be loaded into a vehicle manually by one person without the need for special loading equipment.

The system may include a pneumatic slurry pump that is mounted to the cart. The slurry pump has a slurry liquid inlet, a slurry liquid outlet a pressurized air inlet and an air exhaust vent. Pressurized air may be provided at the job site by a portable compressor. The liquid exiting the slurry outlet is fluidly connected to liquid inlet of a base plate of a filtering device. The base plate is mounted to the cart, above the base. The filtering device includes a flexible filtering vessel removably secured to a lower sealing surface of the top plate. A mounting and sealing structure is provided for removably sealing the flexible filtering vessel to the top plate in a manner that seals the flexible filtering vessel against both the lower sealing surface of the base plate and the upper sealing surface of the mounting and sealing structure. The filtering device is mounted at a height sufficient to permit water that passes through the flexible filtering vessel to fall by means of gravity into a clean water capture system.

A filtering device is disclosed. The device is capable of removing particulates from a water slurry. The device includes a base plate, the base plate having a lower sealing surface and a slurry inlet extending therethrough. The device includes a flexible filtering vessel configured to be removably fixed the base plate and sealed against the lower sealing surface of the base plate. In use, the flexible filtering vessel comprises an interior cavity, and is constructed of a flexible filtering material capable of retaining particulates within the interior cavity, permitting liquid entering through the slurry inlet to pass through the filtering material and withstanding an internal pressure sufficient to form a particulate cake without rupturing the flexible vessel. The filtering device further includes a mounting and liquid sealing system for retaining an upper portion of the flexible filtering vessel against the sealing surface during a filtering operation.

An exemplary filtering device for removing particulates from waste water, comprises a base plate, the base plate including a waste water inlet and a lower sealing surface of an annular outer frustoconical shape adapted for contacting an upper edge of an inner surface of a flexible filtering vessel. The lower sealing surface may surround the waste water inlet. A flexible filtering vessel formed of flexible filtering material and having a conical shape is provided. An upper edge is adapted to contact the lower sealing surface of the base plate. The flexible filtering material has pores of a size sufficient to allow liquid to pass through the material but to prevent particulates of a specified size from passing through the material, permitting particulates to accumulate on an inner surface, to form a cake. A mounting and sealing structure comprising a retaining ring with an inner frustoconical surface adapted to contact an outer surface of the upper edge of the flexible filtering vessel is provided. The mounting and sealing structure further comprises a plurality of fasteners adapted to draw and hold together the retaining ring and the top plate, trapping an upper edge of the flexible filtering vessel therebetween, forming a liquid tight seal.

DETAILED DESCRIPTION

Figure 1:
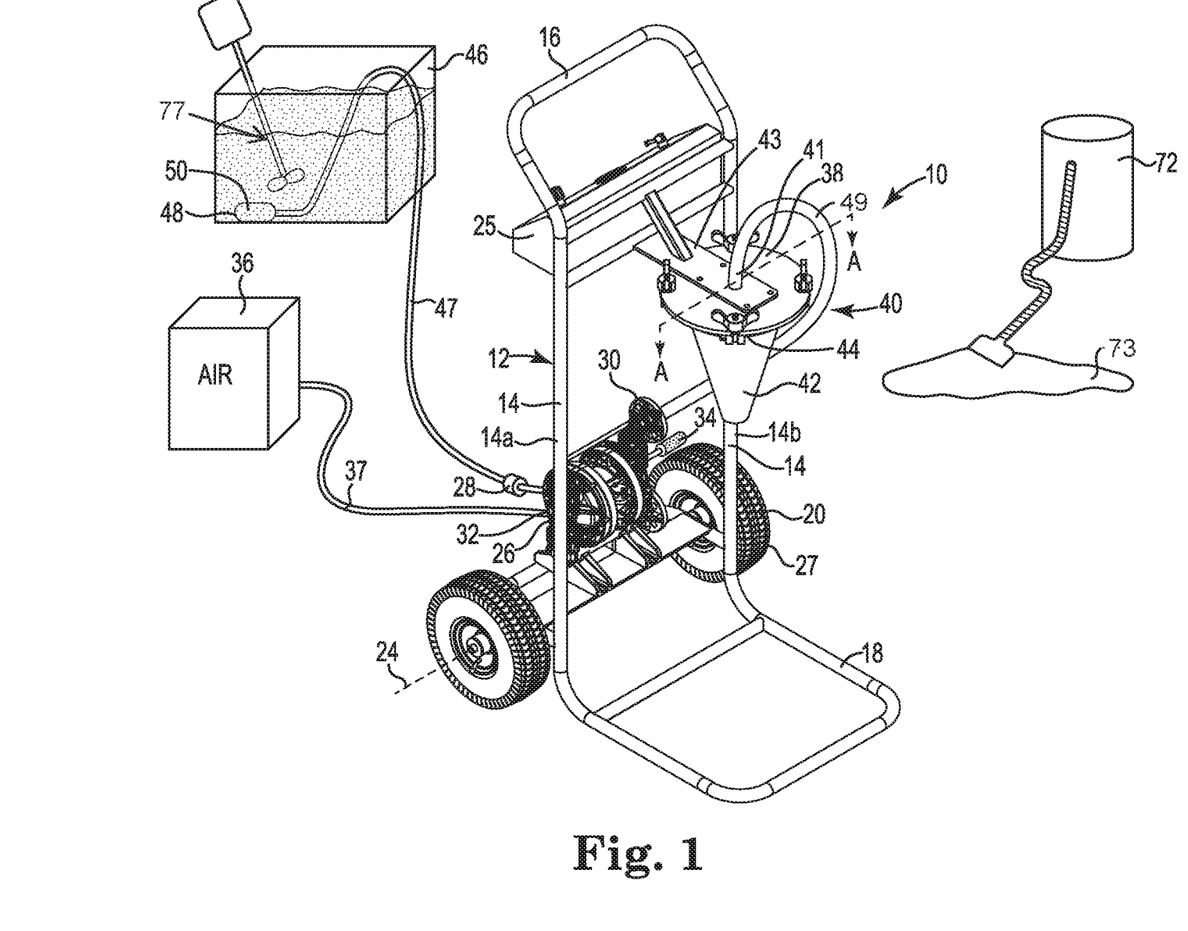
FIG. 1 is a perspective view of an exemplary portable filtration system.

The present invention is a portable filtration system capable of treating a water slurry containing particulates, such as concrete or granite dust. One exemplary system 10 is shown in FIG. 1. Systems of the present invention may comprise a cart 12 configured to retain and transport the filtration system and to facilitate movement and transport from jobsite to jobsite. The cart 12 may be configured with an upright support frame 14 with first and second sides 14a and 14b. The cart 12 may be formed of aluminum or steel tubing and flat stock, angle iron or other shaped metal. The components may be welded or bolted together. A handle 16 may be incorporated into an upper portion of the cart 12, and may be angled rearwardly to facilitate manual tipping. The cart 12 may include a base 18 to stabilize and support the other system components. The cart 12 may include a set of wheels 20 mounted for rotation on an axle that is positioned on axis 24. Axis 24 may be spaced apart from the base 18, allowing the cart to be tipped and manually moved to an area where waste water is being generated. A control panel 25 may be mounted proximate and below the handle 16. Instruments and controls are mounted to the control panel in one embodiment.

In examples of the invention, the system is portable, compact and light enough in weight to be loaded into a vehicle manually by one person without the need for special loading equipment.

The system may include a pneumatic slurry pump 26 mounted to a shelf 27 formed into the cart. The slurry pump 26 in one example is a diaphragm pump capable of pumping up to about 45 gpm and capable of operating at pressures of up to about 120 psi. It is necessary to use pumps that are designed to pump liquids containing large particles, and use pumps that can dead head at high pressures without damaging the pump. Diaphragm pumps are well known for being capable of pumping liquids that contain suspended solids. In one example, a double diaphragm pump, model PDA10A-AA5-AAA, manufactured by Ingersoll Rand with a 1 inch diameter inlet, a 1 inch diameter outlet and Teflon diaphragms is used to pump the slurry material from a job site collection tank 46 through inlet hose 47. The inlet hose 47 at the suction end 48 may include a filter basket 50 to prevent large solids from plugging the pump 26.

Other styles of pumps may be used for this application, such as submersible sump pumps and electric powered gray water and grinder style variable drive waste water pumps. The pump may be powered by electricity or natural gas rather than by air if no compressed air is available. Any diaphragm pump capable of adjustment between zero and 120 psi, that can dead head at any pressure or pumping rate would be suitable.

The pump 26 has a slurry liquid inlet 28, a slurry liquid outlet 30, a pressurized air inlet 32 and an air exhaust vent 34. The exhaust vent 34 may include a perforated muffler to lower the noise level of the pump. Pressurized air may be provided by a portable compressor 36 through air hose 37. One suitable compressed air source supplies about 5.5 cubic feet per minute air at 90 psi.

A regulator (not shown) may be used to adjust the air pressure. A control knob on the control panel 25 (not shown) may regulate the pump air pressure. A pressure gauge (not shown) on the control panel 25 may also be provided to indicate an internal pressure of the filtering device 40 as the cake is being dewatered and formed.

The liquid exiting the pump's slurry outlet 30 is fluidly connected through an outlet hose or pipe 49 to liquid inlet of a base plate 38 of a filtering device 40. The outlet hose or pipe 49 is pressurized so it must be rated for the maximum recommended pressure of approximately 120 psi. The liquid inlet 41 may be a threaded pipe connection or a hose connection capable of withstanding pressures of up to about 120 psi.

The maximum operating pressure of the system is determined by the material of construction and the method of construction of the flexible filtering vessel 42. In one example, the material is 100 percent polyurethane, 15 ounces per square yard, 7×1 Sateen weave, monofilament for warp and weft, with heat set and calendered finish. 2 mil yarn is added into the fill and the material is about 0.026 inches thickness. The material has an air permeability rating of 2 to 4 cubic feet per minute (cfm) rating. This material has a part number 72312C and can be purchased from Crossflow Filtration.

The material may have a smooth side and a coarse side. When the flexible filtering vessel is conical in shape, the smooth side should face inwards to assist with releasing the formed cake from the vessel, enabling the user to reuse the flexible filtering vessel again. When the filtering vessel is tubular in shape, the cake won't release, and the vessel and its contents must be disposed of. In other words, when the vessel is cylindrical, the vessel is a single use application, and when the vessel is conical, the vessel can be reused.

In one embodiment, a liner is placed on the interior of the conical vessel to assist in releasing the cake from the vessel wall. In that case, the cake and liner are disposed of while the flexible filtering vessel can be reused. One advantage of using a conical vessel is that the cake can be dewatered until it is dry enough to meet local disposal requirements. Another advantage is that the cake releases from the inner surface of the conical vessel, and the vessel is reusable. Reusable vessels cost less to use, and conserve the resources needed to make them.

The maximum operating pressure of the filtering device is dependent upon the burst strength of the material used to fabricate the vessel 42, as well as the fabrication techniques used to form the vessel 42. It has been discovered that by using two thicknesses of the filtering material and by sewing a seam along an overlapping edge, the resulting flexible filtering vessel 42 can withstand internal pressures of up to 120 psi and 6031 pounds of force or more without bursting. Some deforming is observed at pressures above about 40 psi but the filtering device 40 continues to operate without bursting.

The material used to fabricate the flexible filtering vessel 42 in one embodiment is able to withstand multiple operating cycles when the shape of the vessel 42 is conical. This feature enables the user to release the cake, and reuse the vessel 42, saving cost and conserving resources. If the pores of the filtering vessel 42 become partially or completely plugged, vessel may be rejuvenated by pressure washing, soaking the vessel 42 in an acid bath and/or rinsing, which opens up the pores.

Figure 2:
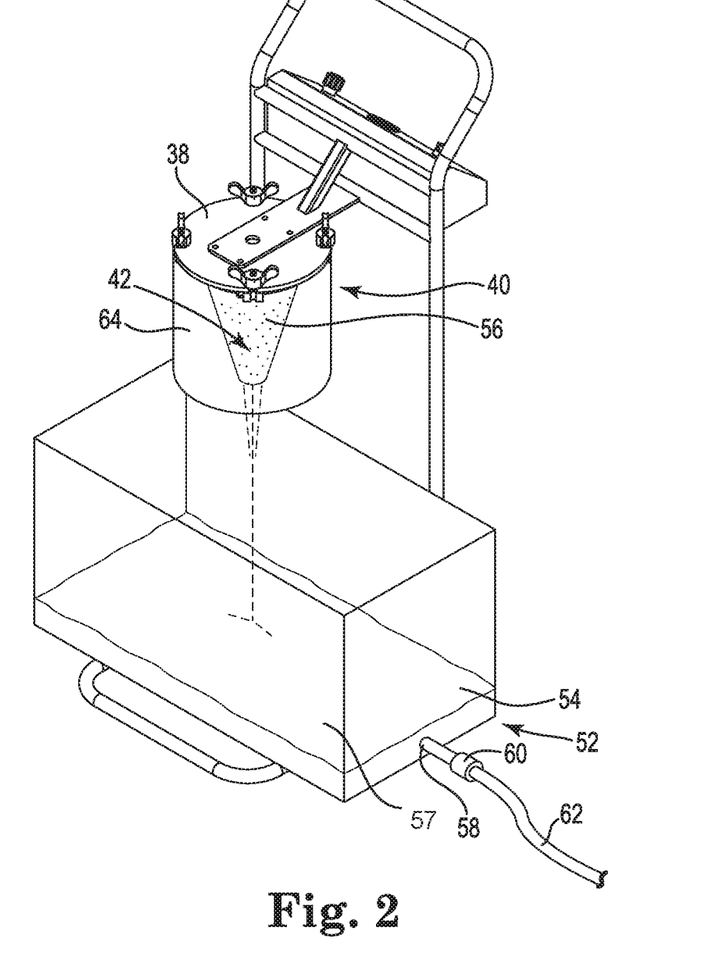
FIG. 2 is a perspective view of an exemplary clean water capture system.

The base plate 38 of the filtering device 40 in an embodiment is constructed of carbon steel and is mounted to a support 43 on the cart 12, at a location spaced above the base 18. The filtering device 40 in embodiments includes a flexible filtering vessel 42 of the type described above and is removably secured to a lower surface of the base plate 38. A mounting and sealing structure 44 is provided for removably sealing the flexible filtering vessel 42 to a lower surface of the base plate 38. The filtering device 40 is mounted at a height sufficient to permit water that passes through the flexible filtering vessel to fall by means of gravity into a clean water capture system 52, as shown in FIG. 2.

In one embodiment, the clean water capture system 52 includes a catch tank 54. The filtering device 40 is positioned directly above catch tank 54. Water passing through the filter membrane flows down an outer surface 57 of the vessel 42, and drops directly into the catch tank 54. Filtered water 56 collects in the tank 54 and may be reused to lubricate and cool cutting and grinding blades or can be drained directly into a floor drain or other sanitary sewer access point. The tank 54 may be small enough for a worker to lift up and dump, or the tank 54 may have an outlet 58 with a valve 60 for disposing of filtered water 56 through an outlet line 62.

The filtering device 40 may be equipped with a cylindrical splash guard 64 attached to a lower surface of base plate 38 to prevent the user from being sprayed if the seal between the base plate 38 and the mounting and sealing structure 44 fails, as will be described in more detail below. The splash guard may be formed of a transparent plastic material or an opaque material such as PVC. The splash guard may include fasteners (not shown) for removably attaching a top portion to the base plate 38.

Figure 3:
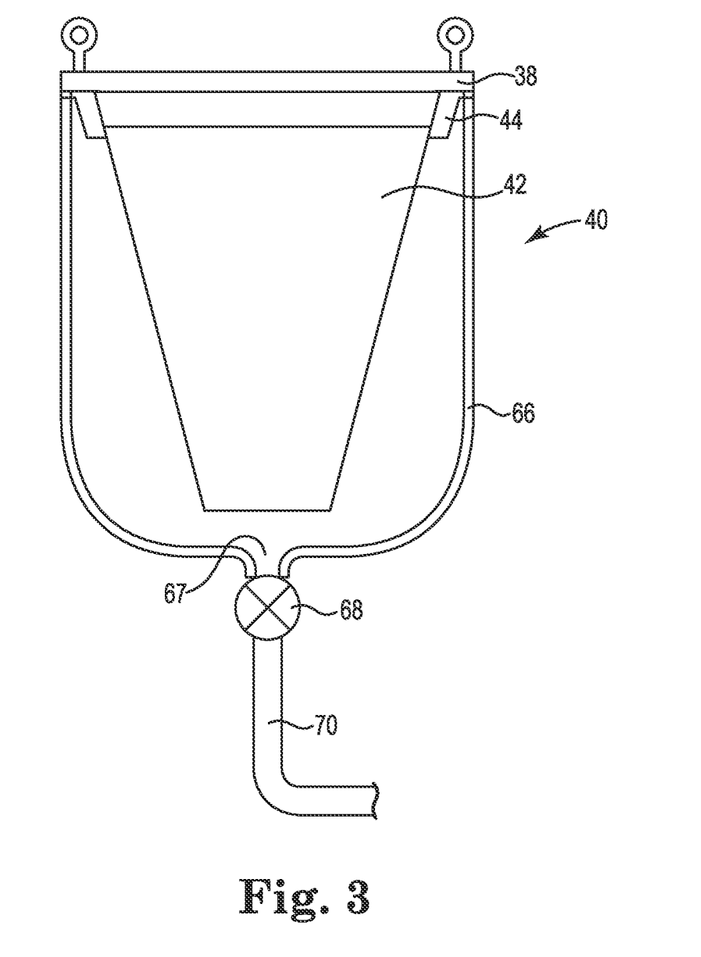
FIG. 3 is a cross-sectional view of a second example of a clean water capture system.

In other embodiments, as shown in FIG. 3, the clean water capture system 52 may be a closed system and may comprise a removeable water tank 66 that is removably attached to the base plate 38 to catch water passing through the flexible filtering vessel 42. The pressure in this tank in one example is atmospheric, and any water collected in the tank drains by means of gravity through outlet 67, through valve 68 into outlet line 70 and on to a fresh water recovery tank (not shown) for reuse or to a liquid disposal area such as a sanitary sewer drain. In another example, the removeable tank 66 may be pressurized so that the filtered water can be delivered into a storage container such as a tall tank by means of pressure.

Referring back to FIG. 1, a wet-dry vacuum 72 may be used to pick up waste water 73 generated by a tool at a job site. This waste water may be placed in a collection tank 46. If needed, a motor-driven an agitator 77 may be used to keep the liquid particles suspended in solution during pumping.

Figure 4:
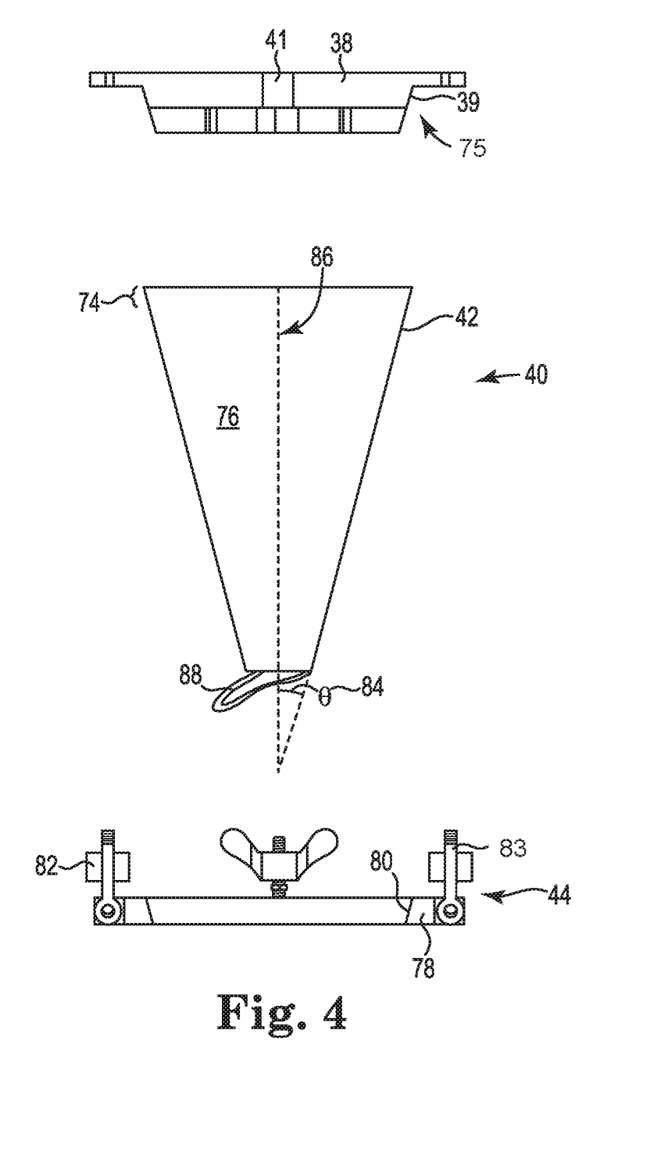
FIG. 4 is a cross-sectional view of an exemplary filtering device of the invention.

A filtering device 40 is shown in side cross-section along lines A-A in FIG. 1 is shown in more detail in FIG. 4. The device 40 is capable of removing particulates from a water slurry that are typically as small as 2-3 microns in size. The particulate side depends upon the material being cut, polished or ground, and the type of filter media used to construct the flexible filtering vessel 42 also depends upon the material.

A good general-purpose filter material may be obtained by ordering part 72312C, as identified above. It has been discovered that this material is capable of filtering out solids from a wide variety of slurries, and is suitable for cleaning up waste water slurries generated when cutting or polishing concrete, mixing small batches of concrete, cutting tiles, patio blocks, cinder blocks, bricks and the like. Other filter materials may need to be used if the type of material being cut produces solids of a different size and shape as compared to the waste materials already identified.

As shown more clearly in FIG. 4, the base plate 38 has an inlet 41 for receiving the slurry to be filtered. On a lower surface 75 of the base plate is a lower sealing surface 39. The slurry inlet 41 is positioned inside of the sealing surface 39, which is frustoconical in shape and is an external or male sealing surface. The device includes a flexible filtering vessel 42 configured with an upper edge portion 74 that is removably fixed to and sealed against on an inner surface the lower sealing surface 39 of the base plate 38. In use, the flexible filtering vessel comprises an interior cavity 76, and is constructed of a flexible filtering material capable of: retaining particulates within the interior cavity 76, permitting liquid entering through the slurry inlet 41 to pass through the filtering material, producing clear water for reuse, making low moisture cakes suitable for disposal, and withstanding an internal pressure sufficient to form a particulate cake without rupturing the flexible vessel. The filtering device further includes a mounting and liquid sealing structure 44 for retaining the flexible filtering vessel 42 to the base plat 38. The structure includes a ring 78 that may be formed of carbon steel. The ring has an upper sealing surface 80 which is frustoconical in shape and is female. This sealing surface 80 cooperates with sealing surface 39 to trap an upper edge 74 of the vessel 42 therebetween, securing the vessel 42 to the base plate 38 while at the same time forming a water tight seal under pressure.

The ring 78 may also have a plurality of clamping devices 82 which secure the ring 78 to the base plate 38. Eye bolts 83 may be used to tighten the clamping devices and secure a seal. Up to four clamping devices 82 may be used on one plate 38 simultaneously in one embodiment.

An exemplary filtering device is provided for removing particulates from waste water, comprises a base plate 38, the base plate 38 including a waste water inlet 41 and a lower sealing surface 39 of an annular outer frustoconical shape adapted for contacting an inner surface of a flexible filtering vessel 42 at upper edge 74 thereof. The lower sealing surface 39 may surround the waste water inlet 41. A flexible filtering vessel 42 formed of flexible filtering material, the vessel having a conical shape is provided. As shown in FIG. 4, the minimum angle 84 between a vertical central axis 86 and the side wall is about 15 degrees. It was discovered that when the angle is below this value, the cake does not easily release from the vessel when the vessel is removed from the base plate 38 so that the cake can be removed.

An upper edge 74 is adapted to contact the lower sealing surface of the base plate. The flexible filtering vessel 42 is formed from a material that has pores of a size sufficient to allow liquid to pass through the material but to prevent particulates of a specified size from passing through the material, permitting particulates to accumulate on an inner surface, to form a cake. The cake forms on the inner surface, and builds inwardly. With sufficient pressure, the entire interior volume of the vessel 42 fills completely.

A mounting and sealing structure 44 comprising a retaining ring 78 with an inner frustoconical surface 80 adapted to contact an outer surface of the upper edge 74 of the flexible filtering vessel 42 is provided. The mounting and sealing structure 44 further comprises a plurality of fasteners 82 adapted to draw and hold together the retaining ring 78 and the base plate 38, trapping an upper edge of the flexible filtering vessel therebetween, forming a liquid tight seal.

In operation, the operator must first install the flexible filtering vessel 42 onto the base plate 38 by positioning the top edge 74 of the vessel 42 between sealing surfaces 39 and 80. To secure the vessel 42 and form a seal, 4 fasteners 82 are inserted and rotated to form a tight seal. Next, the splash guard 64 or atmospheric vessel 66 is installed. The air line may already be connected to the pump, otherwise it must be connected. The suction hose is connected to the pump. The opposite end is positioned in the slurry tank. A catch tank is positioned below the filtering device 40 if a splash guard is used. If an atmospheric or pressurized vessel 66 is used, then a discharge line is connected to the atmospheric or pressurized vessel 66 at one end and the other end is positioned above an access point to either the sewer system, or to a tank where the filtered water may be reused.

After a quantity of waste water is generated by cutting, grinding, polishing or other operation that generates liquid slurry waste, it may be cleaned up manually with brooms, mops, etc. or vacuumed up with a wet-dry vacuum. Water to be treated is placed in a collection tank. If necessary, an agitator is placed in this collection tank to suspend solids while they are being pumped.

The pressure on the air line is set to a pressure representing the maximum pressure that the pump can operate when a full cake is formed in the filter. Higher internal pressures will allow for the creation of a denser, lower water content cake. Lower pressures, such as low as 40 psi still form a suitable cake, but the cake may not be as dry. The desired internal maximum pressure may be set by adjusting the air pressure using a pressure control knob on the control panel 25 while observing the pressure gauge on the control panel 25.

By listening to the sounds made by the pump, the operator may observe when the pump has slowed down and is about to stop pumping. At this point, the air pressure can be turned down, and pressure may be bled off of the vessel 42 by opening a value (not shown) on the filter inlet 41. Then the fasteners 82 may be loosened and the vessel 42 containing the cake is lowered. As shown in FIG. 4, a flexible handle 88 may be provided to grip the vessel 42 when removing it from base plate 38. After removing the ring 78, the vessel may be turned over by grasping handle 88 and shaking the vessel 42 over a solid waste disposal container such as a dumpster. The angle 84 of 15 degrees or greater assists in releasing the cake, as well as placing the smoother surface of the filter media face-in. Or, if a liner is used that is of a type that will release from the filter media forming the vessel 42, a liner could be used inside of the vessel 42 to assist in releasing the cake.

After filtering, it might be desirable to perform tests on the filtered water to confirm that the suspended solids are sufficiently low to allow for safe and lawful disposal. It may also be desirable to test and adjust the pH so that the water meets all applicable pH standards before disposal also.

Systems of the present invention that are mounted onto carts, without hoses weigh less than 100 pounds and can be easily lifted up and lowered out of a utility vehicle. Such systems promote the recycling of water which in some areas of the country is a scarce resource. Use of the system on a job site high above the ground eliminates the need to haul slurry to the ground for disposal. The portable cart may be moved through buildings and hallways and put onto elevators because the structure is so compact and light in weight. The filtering vessel may be reused, which conserves the resources needed to manufacture the vessel, reduces vessel waste and keeps the operating costs down. The system allows the operator to use and reuse small amounts of water, which prevents water damage and keeps the job site clean. Filtering systems that use only one filter mounted to a lightweight frame instead of a larger, heavier, more expensive filter press and that uses the filter media itself as the pressure vessel are not only convenient, but are economical and are useful to assist the operator of a small job to provide comprehensive and compliant disposal of construction project waste.

The description provided above is intended to illustrate examples the invention and are not meant to limit the full scope of the invention.

What is claimed is:

1. A portable filtration system for filtering a slurry of water with particulates, comprising;
    a cart configured to retain and transport the filtration system;
    a pneumatic slurry pump mounted to a lower shelf of the cart to pump the slurry of water, the slurry pump having a slurry pump inlet, a slurry pump outlet and a pressurized air inlet;
    a base plate mounted to the cart, the base plate having a liquid inlet for receiving the slurry of water from the slurry pump outlet;
    a flexible filtering vessel affixed to a lower sealing surface of the base plate; and
    a mounting and sealing structure for mounting the flexible filtering vessel to the base plate and sealing an upper edge of the flexible filtering vessel to the base plate,
    wherein the flexible filtering vessel receives the slurry of water via the liquid inlet of the base plate and filters the particulates from the slurry of water to provide filtered water, wherein the flexible filtering vessel is mounted vertically above the slurry pump and at a height sufficient to permit the filtered water that passes through the flexible filtering vessel to fall into a clean water capture system.

2. The system of claim 1, wherein the cart has an upright support frame, a handle, a base, and wheels mounted to a rotatable axle mounted to a portion of the frame spaced apart from the base.

3. The system of claim 1 and further comprising a control panel, the control panel comprising a control for controlling a desired maximum pressure and a pressure gauge for measuring pressure within the flexible filtering vessel during operation.

4. A portable particulate cake filtering system capable of filtering particulates from a water slurry and forming a particulate cake therefrom, comprising:
- a portable cart configured to retain and transport the filtering system, the cart including a lower shelf formed into the cart, an upper support extending outward from an upright support frame of the cart and cart wheels;
- a slurry pump mounted to the lower shelf, the slurry pump having a slurry pump inlet and a slurry pump outlet;
- a base plate mounted to the upper support, the base plate comprising a lower sealing surface and a slurry inlet extending therethrough that receives the water slurry from the slurry pump outlet;
- a flexible filtering vessel configured to be removably fixed to and sealed against the lower sealing surface of the base plate, and further comprising an interior cavity, wherein the flexible filtering vessel is formed of a flexible filtering material capable of retaining the particulates within the interior cavity, permitting the water slurry entering through the slurry inlet of the base plate to pass through the flexible filtering material which filters the particulates therefrom and withstanding an internal pressure sufficient to form from the particulates the particulate cake without rupturing the flexible filtering vessel while the particulate cake is forming; and
- a mounting and liquid sealing system for retaining an upper portion of the flexible filtering vessel against the lower sealing surface during a filtering operation and for releasing the formed particulate cake at an end of the filtering operation.

5. The system of claim 4, wherein the flexible filtering vessel is reusable.

6. The system of claim 4, wherein the flexible filtering vessel is disposable.

7. The system of claim 4, the slurry pump is a pneumatic slurry pump.

8. The system of claim 4, wherein the filtering material is capable of withstanding an internal pressure of up to 120 psi, and has an air permeability between 2 and 4 cfm.

9. The system of claim 4, wherein the lower sealing surface of the base plate comprises an outer annular ring.

10. The system of claim 9, wherein the mounting and liquid sealing system comprises a circumferential clamp of a size that sits within the outer annular ring.

11. The system of claim 10, wherein an upper edge of the flexible filtering vessel is positioned between the outer annular ring and the circumferential clamp.

12. The system of claim 4, wherein the lower sealing surface of the base plate has an outer frustoconical sealing surface.

13. The system of claim 12, and further comprising a mounting and sealing structure comprising a ring with an inner frustoconical sealing surface that cooperates with the outer frustoconical sealing surface of the base plate to trap an upper edge of the flexible filtering vessel to retain the flexible filtering vessel against the base plate and to form a liquid seal under pressure.

14. The system of claim 13, wherein the flexible filtering vessel is conical in shape, and wherein an angle formed between a vertical line bisecting a center of the flexible filtering vessel and an outer surface of an exterior wall of the flexible filtering vessel is at least 15 degrees.

15. The system of claim 4, wherein the flexible filtering vessel has an integrated handle connected to the flexible filtering material in a lower end opposite the upper portion.

16. The system of claim 4, and further comprising an exterior splash guard that surrounds the flexible filtering vessel.

17. The system of claim 4, and further comprising an exterior tank wall surrounding an exterior surface of the flexible filtering vessel, the tank wall comprising a clean water outlet and an exterior tank sealing surface for sealing against the lower sealing surface of the base plate.

18. The system of claim 4, wherein the flexible filtering vessel is formed from two thicknesses of the flexible filtering material, and wherein two edges of the flexible filtering material are machine sewn, forming a seam in a wall of the flexible filtering vessel.

19. A portable particulate cake filtering system capable of filtering particulates from a water slurry to form a particulate cake, comprising:
- a portable cart configured to retain and transport the filtering system, the cart including a lower shelf formed into the cart and an upper support extending outward from the cart;
- a slurry pump mounted to the lower shelf, the slurry pump having a slurry pump inlet and a slurry pump outlet;
- a base plate mounted to the upper support, the base plate comprising a lower sealing surface and a slurry inlet extending therethrough that receives the water slurry from the slurry pump outlet;
- a flexible filtering vessel configured to be removably fixed to and sealed against the lower sealing surface of the base plate, and further comprising an interior cavity, wherein the flexible filtering vessel is formed of a flexible filtering material capable of retaining the particulates from the water slurry within the interior cavity, permitting the water slurry entering the flexible filtering vessel through the slurry inlet to pass through the flexible filtering material which filters the particulates from the water slurry and withstanding an internal pressure sufficient to form the particulate cake without rupturing the flexible filtering vessel while the particulate cake is forming;
- a mounting and liquid sealing system for retaining an upper portion of the flexible filtering vessel against the lower sealing surface during a filtering operation and for releasing the particulate cake at an end of the filtering operation;
- the flexible filtering material comprising a flexible body formed of a liquid permeable material that has an internal burst pressure of 120 psi and is capable of retaining the particulates;
    - wherein the flexible body has an interior cavity defined by an inner surface capable of forming the particulate cake thereon; and
    - wherein the flexible body has a sealing edge capable of sealing against the lower sealing surface of the base plate;
- wherein the flexible body supports a forming of the particulate cake as the water slurry passes through the flexible body;

wherein a shape of the flexible body is conical, including a first end that seals against the lower sealing surface of the base plate, and a second end opposite the first end; and a handle affixed to the second end opposite the sealing edge to aid in releasing the particulate cake from the flexible body.

20. The system of claim 19, wherein the flexible body is formed of a polyurethane material.

21. The system of claim 20, wherein the flexible body is formed from two layers.

22. The system of claim 19 comprising:

a splash guard that surrounds the flexible body, the splash guard including a splash guard first end attached to the lower sealing surface of the base plate, and a splash guard second end that is adjacent the second end of the flexible body.

* * * * *